United States Patent
Deyris

[15] 3,649,192
[45] Mar. 14, 1972

[54] METHOD OF MANUFACTURING SEMICONDUCTOR COMPOUNDS

[72] Inventor: Emile Deyris, Caen, France
[73] Assignee: U.S. Philips Corporation, New York, N.Y.
[22] Filed: Mar. 21, 1969
[21] Appl. No.: 809,133

[30] Foreign Application Priority Data

Mar. 22, 1968 France..................................145048

[52] U.S. Cl. .................................23/204 R, 23/294, 23/300
[51] Int. Cl. ....................C01b 27/00, B01d 9/00, B01j 17/00
[58] Field of Search....................23/204 R, 294, 273 R, 300; 148/1.6, 175

[56] References Cited

UNITED STATES PATENTS 3,353,912   11/1967   Ainslie.....................................23/204

*Primary Examiner*—Oscar R. Vertiz
*Assistant Examiner*—Hoke S. Miller
*Attorney*—Frank R. Trifari

[57] ABSTRACT

A method of making III–V semiconductor compounds in which a quantity of boron oxide is added to the reactants in a closed vessel to inhibit reactions with the material of the vessel, e.g., silicon dioxide.

3 Claims, 1 Drawing Figure

PATENTED MAR 14 1972 3,649,192
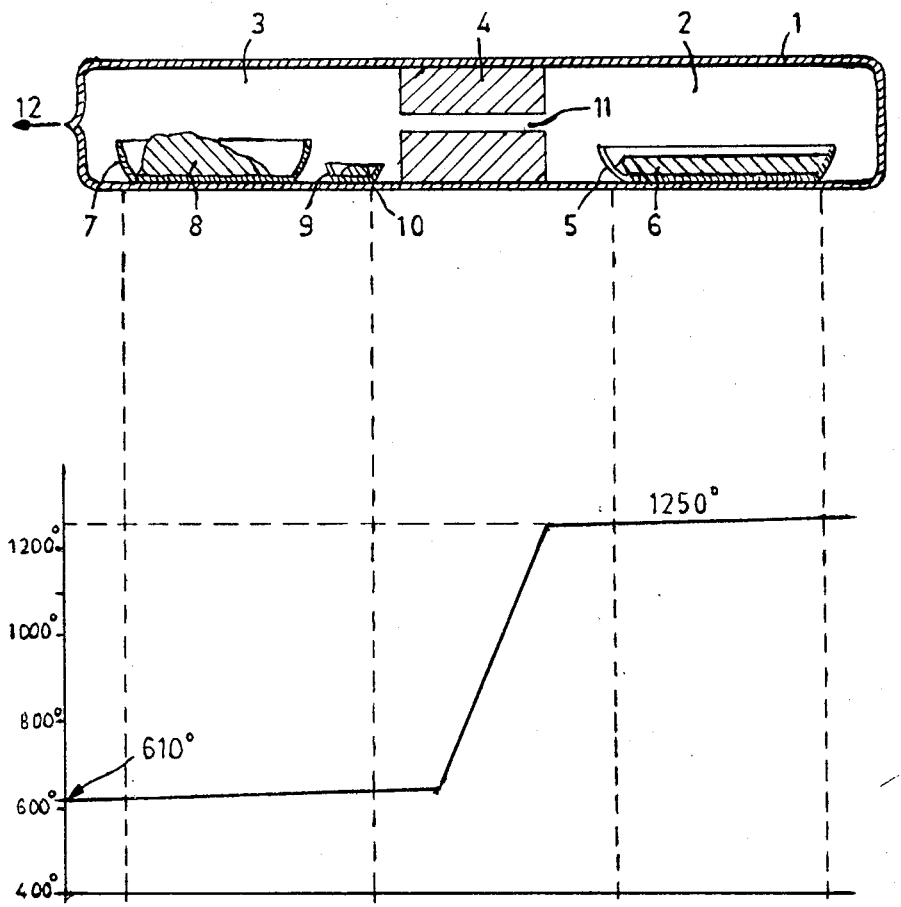
INVENTOR.
EMILE DEYRIS
BY
[signature]
AGENT

METHOD OF MANUFACTURING SEMICONDUCTOR COMPOUNDS

The invention relates to a method of manufacturing a rod of a semiconductive $A_{III}B_V$ compound by gradual crystallization in a closed reactor, and particularly to a method of forming gallium arsenide in which it is possible to obtain monocrystals having a large mobility of electrons.

The semiconductive compounds formed by atoms of an element of group III of the periodic system of the elements, and of atoms of elements of group V are termed $A_{III}B_V$ compounds.

The formation of these semiconductive compounds is usually obtained according to the Bridgman method, in which a rod is formed in a horizontal boat by reaction of the components at a temperature which is at least equal to the melting temperature of the compound under an adapted pressure of the most volatile component, succeeded by a gradual cooling so that the liquid phase of the compound gradually crystallizes from one end of the boat.

The crystal always comprises impurities, the most important of which are: carbon, nitrogen, oxygen, sulphur and silicon. Most of these impurities can be removed by purification treatments of the components, degassing, and precautions which are taken in the known methods of manufacturing semiconductor materials.

However, silicon is an impurity which is hard to remove and which is formed particularly by reactions between the components or the compound itself and the silicon oxide from which the envelopes or boats which are used for forming the compound are usually manufactured; due to its thermal properties, its refractoriness, its low thermal coefficient, its possibilities of processing as well as its transparency and its low chemical reactivity silicon oxide is to be preferred as a material for these envelopes or boats.

For example, in manufacturing gallium arsenide, which is carried out at approximately 1,250° C, the gallium in the liquid phase or in the vapor phase even reacts in a reactor of very pure quartz with the silicon dioxide $SiO_2$ according to the reaction $$4\,Ga + SiO_2 \rightarrow Si + 2Ga_2O \quad (1)$$

The formed gallium suboxide $Ga_2O$ diffuses in the reactor space in the vapor phase and the liberated silicon tries to penetrate into the gallium arsenide, as a result of which the impurity concentration of said arsenide is increased and the resistivity as well as the mobility of electrons are reduced.

It has been tried to avoid said contamination of a compound by the silicon originating from the reaction of the silicon dioxide used during its manufacture by providing a certain quantity of oxygen in the reactor at a low pressure. The pressure must be adjusted accurately, because oxygen has a favorable effect only in a narrow range of values of said pressure. Another drawback is that the compound tends to dissolve the oxygen which is the case with gallium arsenide and the supply of oxygen may cause a doping by oxygen if the conditions are not well controlled.

Another known method of forming gallium arsenide consists of supplying gallium sesqui-oxide, $Ga_2O_3$; it is likely that in order to restrict the above-indicated reaction (1) it is necessary to favour the formation of a sufficiently large partial pressure of $Ga_2O$: this compound is not soluble in gallium arsenide but may be conducted along by the arsenic vapors and form the more stable sesqui-oxide according to the reaction: $3\,Ga_2O + 2As_2$ (or $As_4$) $\rightarrow Ga_2O_3 + 4\,GaAs$ (2)

The addition of $Ga_2O_3$ would have to prevent the reaction (2) and hence restrict the reaction (1). Although appreciable results have been obtained, the gallium arsenide rods formed according to this method do not always have optimum properties and for the addition of $Ga_2O_3$ to be favorable, it has to be controlled very carefully.

It is the object of the invention to obtain a high-purity compound having a very large mobility of electrons in the form of a monocrystal of large dimensions, substantially free from crystal defects and useful particularly for manufacturing high frequency devices, for example, devices having Gunn effect.

During the formation of semiconductive $A_{III}B_V$ compounds, for example, gallium arsenide, according to the Bridgman method, applicants have found that an addition of an oxide having a stability which approaches that of the silicon dioxide, $SiO_2$, and chosen from the oxides of the elements of the groups III and V of the periodic system, and which does not react with the components of the compound and the compound itself at the formation temperature and is insoluble in the said compound in the liquid phase, prevents the contamination by the silicon during the formation of the said compound in a reactor having walls from silicon dioxide.

Such an oxide does not involve any danger of doping the compound, but it presumably reacts with the silicon formed, for example, during a reaction as the said reaction (1), as a result of which the silicon is prevented from contaminating the compound during its formation.

The oxide chosen is boron oxide of which it is known that is does not contaminate the semiconductive $A_{III}B_V$ compounds, for example, gallium arsenide, indium arsenide, and so on, but that on the contrary it may play the part of a getter for the metal oxides and probably for other impurities which may contaminate the compound to be formed.

According to the invention, the method of manufacturing a rod of a semiconductive $A_{III}B_V$ compound by gradual crystallization in a closed reactor is characterized in that a comparatively small quantity of boron oxide is introduced into the reactor and is kept at the temperature of the most volatile component during the formation of the compound and the crystallization.

The crystals, notably of gallium arsenide, obtained by the method according to the invention have the required properties for the most stringent applications, for example, for high frequency devices. The addition of boron oxide is a simple and particularly efficacious step to obtain the required purity and mobility of electrons; the devices used are devices which are conventionally used in such cases; the results are reproducible and by dosing the addition of boron oxide it is possible to obtain certain properties with all the other conditions unchanged.

In the method according to the invention, there exists no danger of contaminating the semiconductor; actually it is known that boron oxide, used as a protection in drawing gallium arsenide, indium arsenide, or other $A_{III}B_V$ compounds according to the method of liquid encapsulation, does not increase at all the impurity content of the compound. The boron oxide is chemically stable, arsenic is not soluble in it. In the case of the addition according to the invention this oxide has the advantage of requiring no special purity; the usually available "semiconductor" quality may be used in this case.

In a preferred embodiment of the method according to the invention of manufacturing a gallium arsenide rod, the temperature at which the boron oxide is maintained corresponds to that at which the arsenic pressure in the reactor is at least equal to the decomposition pressure of the compound at its melting temperature.

In another preferred embodiment of the method according to the invention a quantity of gallium is introduced in the first space of a closed reactor which is constituted by two spaces communicating with each other, and a quantity of arsenic exceeding the quantity of gallium and a quantity of boron oxide equal to 0.2 to 3 percent of the weight of gallium is placed in the second space, the first space is heated at approximately 1,270° and the second space is heated at at least 610° C. and, after maintaining said temperatures for at least the period which is required for the formation of the compound, the first space is gradually cooled in a manner commonly used in manufacturing monocrystals.

The gallium arsenide obtained in the form of a monocrystal according to the above-mentioned embodiment has very good crystal properties. The concentration of charge carriers and their mobility are determined by dosing boron oxide, taking into account the thermal treatment which is usually applied to the monocrystal after the formation of the compound and which improves said properties in certain conditions.

In order that the invention may be readily carried into effect, it will now be described in greater detail, by way of example, with reference to the accompanying drawing.

In the following description, the manufacture of gallium arsenide monocrystals is described by way of example, but other semiconductive $A_{III}B_V$ compounds may of course also be obtained according to the method of to the invention. Monocrystals may also be obtained starting from polycrystalline compounds under the same circumstances.

The attached drawing is a diagram of the reactor used for the formation of gallium arsenide.

The apparatus used for such a formation comprises a hermetically closed quartz tube 1, divided into two spaces 2 and 3 by a diaphragm 4 which also consists of quartz and which leaves a narrow passage 11.

A boat 5 containing a quantity of gallium 6 is situated in the space 2. A boat 7 with a quantity of arsenic 8 and a boat 9 with a small quantity of boron oxide 10 are situated in the space 3. The boats 5, 7 and 9 are of quartz. The gallium 6 is purified beforehand in vacuo, the boron oxide is carefully dried, the arsenic 8 and the apparatus are heated in vacuo before the reactor tube 1 is sealed in a vacuum.

The reactor 1 is in then placed in a heater (not shown) for heating the whole space 2 at a temperature exceeding 1,240° C. and at the same time heating the whole space 3 at a temperature of at least 610° C. The temperatures prevailing in the reactor are shown in the corresponding diagram in the Figure in the diagrammatic cross-sectional view of the reactor. An important gradient is seen between the two spaces 2 and 3 the length of which corresponds to the passage 11 of the diaphragm.

The said temperatures are maintained during the time which is necessary for the complete reaction between the gallium in the liquid phase in the boat 5 and the arsenic vapor at a pressure of at least 0.9 atm. imposed by the minimum temperature in the space 3, namely 610° C.

During the formation reaction, the liquid gallium attacks the silicon dioxide of the boat and the gaseous gallium attacks the silicon dioxide of the reactor. Probably the s$rface attack which occurs below the level is very rapidly restricted by the fact that the vapor of gallium suboxide cannot diffuse. In addition the attack is everywhere restricted by the presence of boron oxide in the vapor phase which diffuses in arsenic vapor namely in the region of the space 3 where gallium vapors can condense.

After the formation reaction, the reactor is gradually cooled, either by slowly removing it from the heater in the direction of the arrow 12, or by controlling the heating to crystallize in this manner the formed gallium arsenide starting, for example, at the end of the boat 5 beside the diaphragm 4.

During solidification the boron oxide remains active.

As compared with a crystal obtained in a similar manner but without the presence of boron oxide, the resulting gallium arsenide crystal has a lower concentration of impurities, particularly of silicon. In addition the density of the crystal defects decreases and the mobility of electrons increases.

The detailed forming conditions are now given by way of example of a gallium arsenide crystal obtained by the method according to the invention.

The reactor used is a closed quartz tube having a length of approximately 70 cm. The boat 5 contains 175 g. of gallium. The boat 7 contains 180 g. of arsenic. The boat 9 contains 0.5 g. of boron oxide. The formation temperatures correspond substantially to those indicated in the curve of the Figure. They are maintained for 2 to 3 hours. Cooling is then effected by drawing at a rate of 1 cm. per hour through a gradient of 15° per cm of tube length.

After thermal tempering, a monocrystal is obtained with a concentration of charge carriers of the order of magnitude of $10^{15}$ and the mobility of electrons of which is equal to 30,000 cm.$^2$ per volt and per second measured at 77° K, and equal to 6,000 cm.$^2$ per volt and per second at 300° K.

The quantity of boron oxide used in this example corresponds to a mobility which makes the monocrystal useful for manufacturing devices having Gunn effect. Other values can be obtained by using other quantities of boron oxide. If the maximum quantity of 3 percent is used, a semiinsulating gallium arsenide is obtained on the contrary destined for substrates by epitaxy, the resistivity of which may be $10^7$ ohm.cm.

It is obvious that variations may be applied to the embodiments described without therefore departing from the scope of this invention.

What is claimed is:

1. A method of manufacturing a rodlike crystal of a semiconductive $A_{III}B_V$ compound by gradual crystallization in a closed quartz reactor, comprising the steps of placing in the reactor measured quantities of an $A_{III}$ and a $B_V$ element sufficient to form the $A_{III}B_V$ compound, introducing into the reactor a quantity of $B_2O_3$ sufficient to inhibit reactions between the material of the reactor and the elements $A_{III}B_V$, and heating said reactor at least to a temperature at which one of said elements volatilizes to form the rodlike crystals free of impurities from the wall of the reactor.

2. A method as claimed in claim 1, in which the $A_{III}$ element is gallium and the $B_V$ element is arsenic and the reactor is heated to a temperature at which the vapor pressure of the arsenic is at least equal to that of arsenic above gallium arsenide at the melting temperature of the latter.

3. A method as claimed in claim 2, in which the reaction is carried out in a closed reactor, which is formed by two spaces which communicate with each other, a quantity of gallium being introduced in the first of the said spaces and a quantity of arsenic exceeding the quantity of gallium and a quantity of boron oxide which is equal to 0.2 to 3 percent of the weight of gallium is introduced in the second space, the first space is heated at approximately 1,270° C. and the second space is heated at at least 610° C. and, after maintaining said temperatures for at least the period necessary for the formation of the compound, the first space is gradually cooled in a conventional manner.

* * * * *

UNITED STATES PATENT OFFICE
CERTIFICATE OF CORRECTION

Patent No. 3,649,192                Dated March 14, 1972

Inventor(s) EMILE DEYRIS

It is certified that error appears in the above-identified patent and that said Letters Patent are hereby corrected as shown below:

IN THE TITLE

Change the present title to read --METHOD FOR THE PRODUCTION OF III-V SEMICONDUCTOR COMPOUNDS--

Signed and sealed this 22nd day of August 1972.

(SEAL)
Attest:

EDWARD M. FLETCHER, JR.            ROBERT GOTTSCHALK
Attesting Officer                    Commissioner of Patents